(12) United States Patent
Banerjee et al.

(10) Patent No.: US 11,834,358 B2
(45) Date of Patent: Dec. 5, 2023

(54) PROCESS FOR TREATING FRAC FLOWBACK AND PRODUCED WATER INCLUDING NATURALLY OCCURRING RADIOACTIVE MATERIAL

(71) Applicant: Veolia Water Solutions & Technologies Support, Saint-Maurice (FR)

(72) Inventors: Kashi Banerjee, Carnegie, PA (US); Charles Blumenschein, Pittsburgh, PA (US); Hillary Kronebusch, Pittsburgh, PA (US); Sarah Petrovich, Humble, TX (US)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 103 days.

(21) Appl. No.: 17/258,181

(22) PCT Filed: Jul. 8, 2019

(86) PCT No.: PCT/US2019/040779
§ 371 (c)(1),
(2) Date: Jan. 6, 2021

(87) PCT Pub. No.: WO2020/014109
PCT Pub. Date: Jan. 16, 2020

(65) Prior Publication Data
US 2021/0163327 A1 Jun. 3, 2021

Related U.S. Application Data

(60) Provisional application No. 62/695,921, filed on Jul. 10, 2018.

(51) Int. Cl.
*C02F 9/00* (2023.01)
*C02F 1/52* (2023.01)
(Continued)

(52) U.S. Cl.
CPC .............. *C02F 9/00* (2013.01); *C02F 1/5236* (2013.01); *C02F 1/62* (2013.01); *C02F 1/66* (2013.01);
(Continued)

(58) Field of Classification Search
CPC ........................................................ C02F 9/00
See application file for complete search history.

(56) References Cited

U.S. PATENT DOCUMENTS 7,963,338 B1 6/2011 Bader
8,894,864 B2 11/2014 Karrs et al.
(Continued)

FOREIGN PATENT DOCUMENTS

EP          2444377 A1   4/2012
WO     20180132426 A1   7/2018

*Primary Examiner* — Peter Keyworth
(74) *Attorney, Agent, or Firm* — COATS & BENNETT, PLLC

(57) ABSTRACT

A process for treating frac flowback that contains barium, naturally occurring radioactive materials (NORM) and hardness for minimizing the amount of sludge produced that contains hazardous levels of NORM by employing a dual stage precipitation process. In the first stage a sulfate source is mixed with the frac flowback and barium sulfate and NORM is precipitated, the frac flowback is subjected to a solids-liquid separation process to produce a first effluent and a first sludge. In the second stage hardness is precipitated from the first effluent by addition of an alkali reagent, said first effluent is also subjected to solids-liquid separation producing a second effluent and a second sludge. The first sludge is recycled and mixed with the frac flowback and the sulfate source in a sufficient amount to maintain the NORM concentration in the second sludge at or below a threshold level.

8 Claims, 2 Drawing Sheets

(51) Int. Cl.
*C02F 1/62* (2023.01)
*C02F 1/66* (2023.01)
*C02F 5/06* (2023.01)
C02F 1/00 (2023.01)
C02F 101/00 (2006.01)
C02F 101/20 (2006.01)
C02F 103/36 (2006.01)

(52) U.S. Cl.
CPC .......... *C02F 5/06* (2013.01); *C02F 2001/007* (2013.01); *C02F 2101/006* (2013.01); *C02F 2101/20* (2013.01); *C02F 2103/365* (2013.01); *C02F 2209/003* (2013.01); *C02F 2209/055* (2013.01); *C02F 2209/06* (2013.01); *C02F 2209/07* (2013.01); *C02F 2209/19* (2013.01); *C02F 2301/046* (2013.01); *C02F 2301/08* (2013.01)

(56) References Cited

U.S. PATENT DOCUMENTS

2013/0248455 A1 9/2013 Blumenschein et al.
2017/0073255 A1 3/2017 Vidic

PROCESS FOR TREATING FRAC FLOWBACK AND PRODUCED WATER INCLUDING NATURALLY OCCURRING RADIOACTIVE MATERIAL

RELATED APPLICATIONS

The present application is a U.S. National Stage Application of PCT Application No. PCT/US2019/040779, with an international filing date of Jul. 8, 2019. Applicant claims priority based on U.S. Provisional Patent Application No. 62/695,921 filed Jul. 10, 2018. The subject matter of these applications is incorporated herein in their entirety.

FIELD OF THE INVENTION

The present invention relates to processes for treating frac flowback or produced water and more particularly to processes for removing barium, radium, iron, magnesium and heavy metals from frac flowback or produced water.

BACKGROUND OF THE INVENTION

Frac flowback from a fracking operation includes many contaminants. To name a few, frac flowback may include calcium, magnesium, sodium, chloride, barium, strontium, bicarbonate, ammonia, benzene and radium and other naturally occurring radioactive materials (NORM). Removing radium and other NORM is particularly problematic. Although radium can be precipitated from the frac flowback, the problem lies in disposing of the resulting sludge that is contaminated with relatively high concentrations of NORM. Sludge that contains a relatively high concentration of NORM cannot be disposed of in conventional landfills. Instead, such sludge is deemed hazardous waste. More sophisticated and costly options have to be employed. Thus, there is a need to develop efficient processes designed to reduce as much as practical the production of sludge that includes a NORM concentration that renders the sludge a hazardous waste.

One process that treats frac flowback containing NORM is disclosed in U.S. Pat. No. 8,894,864 (the '864 process). In the '864 process, the feed includes both barium and radium. Sulfate is mixed with the feed, causing barium sulfate and radium to co-precipitate. There are numerous disadvantages and drawbacks to this process. First, the '864 process requires the addition of barium in the event that the ratio of barium to radium is below a certain value. Not only does adding barium increase cost, but adding barium increases the production of sludge, which in turn leads to additional operating and disposal costs. Also, the '864 process, due to its design and inherent limitations, does not make efficient use of the sulfate that is added to the process. In order to remove radium to meet threshold requirements, requires the addition of excess sulfate. Adding excess sulfate leads to precipitation of strontium and this, in turn, generates more sludge than is necessary, which requires disposal as a hazardous waste due to the concentration of NORM sludge. Again, due to the nature of the '864 process, mixers and associated piping will likely be substantially scaled with barium sulfate. This is because there are no seed crystals in the reactors. Without seed, barium sulfate will start to precipitate on the surfaces of the equipment and continue in downstream piping, thus fouling downstream equipment. Scaling will continue until the equipment is rendered virtually useless or requires descaling.

One of the major drawbacks of the '864 process is that it requires on-going analysis of the radium concentration in the feedwater. There is no quick and easy means of measuring radium concentration with good accuracy online in the field. Thus, laboratory analysis is required and this does not allow steady state control based on the level of radium in the frac flowback.

There is a need for an efficient and easily controlled process for treating radium-containing frac flowback where the amount of produced sludge containing hazardous amounts of radium is reduced to practical low levels.

SUMMARY OF THE INVENTION

The present invention entails an efficient process for treating radium-containing frac flowback that minimizes or reduces, as much as practical and feasible, the amount of sludge produced that contains hazardous levels of radium.

More particularly, in one embodiment, the process includes first and second stages of precipitation that produces a first sludge and a second sludge where the first sludge contains a radium concentration that exceeds a threshold and the second sludge contains a radium concentration at or below the threshold. In the first stage, a sulfate source is mixed with the frac flowback and this in turn leads to the precipitation of barium sulfate and NORM and the production of sludge that includes the precipitated barium sulfate and NORM.

To improve the overall efficiency of the process, a substantial portion of the first sludge is recycled and mixed with the frac flowback and the sulfate source. This substantially increases the overall efficiency of the process. Recycling a significant amount of the first sludge results in a process where there is little, if any, barium addition required and at the same time makes efficient use of the sulfate added in order to precipitate barium sulfate and the NORM.

Another feature of one embodiment of the radium removal process discussed below is that continuous or frequent measurement of the radium concentration in the frac flowback is not required. By continuously recycling a significant amount of the first sludge containing barium sulfate, it follows that generally there is sufficient barium and sufficient sulfate present in the feed to address typical radium concentrations.

Other objects and advantages of the present invention will become apparent and obvious from a study of the following description and the accompanying drawings which are merely illustrative of such invention.

EXEMPLARY EMBODIMENTS OF THE PRESENT INVENTION

Figure 1:
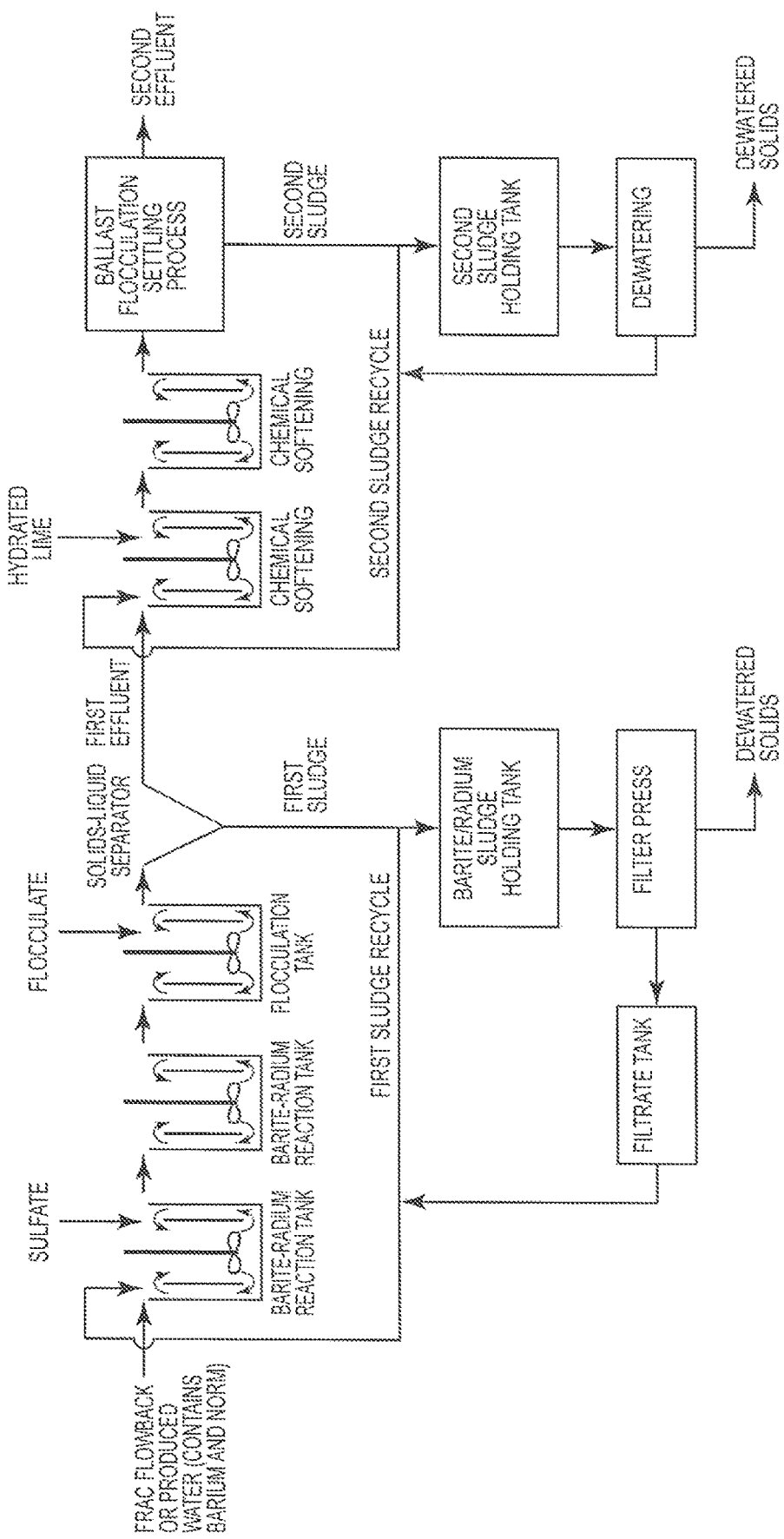
FIG. 1 is a schematic drawing showing the process for treating frac flowback that removes radium and other NORM and minimizes the production of sludge that contains high concentrations of radium and other NORM.

The present invention relates to a system and process for treating hydrofracking wastewater which is typically termed frac flowback or produced water. Frac flowback is typically the water that results immediately after fraccing the well.

Produced water is water that comes after the flowback. For convenience, the term "frac flowback" is used herein to also include produced water thus, as used herein, frac flowback and produced water are used interchangeably.

As will be appreciated from the disclosure below, the present invention is directed at treating frac flowback that contains barium, radium and other forms of NORM, as well as other contaminants. The technical problem is first to minimize or reduce the amount of sludge containing a NORM concentration that is elevated to a point that it is deemed or classified a hazardous waste. Secondly, the technical problem is to achieve this aim in a highly efficient manner that makes efficient use of both the sulfate added and the barium in the frac flowback. By doing such, the addition of barium is not generally required. The amount of sulfate required to be added is minimized. Efficiently making use of sulfate and barium reduces total sludge production and also minimizes barium sulfate scale in downstream piping and equipment.

Frac flowback is treated in a two-stage sludge production process where the sludge produced in a first stage includes barium and sulfate and a relatively high NORM concentration that may be sufficiently high that the first sludge is deemed a hazardous waste. The second stage sludge, comparatively large compared to the first stage sludge, includes a relatively low concentration of NORM, a concentration that is sufficiently low such that the second stage sludge is not deemed a hazardous waste but can be disposed of in a conventional landfill. Efficiency is realized by recycling a substantial amount of the first sludge since the first sludge contains sulfate and barium. Moreover, in many instances, the first stage sludge recycle rate is aggressive and larger than is typically found in industrial wastewater treatment processes. In tests conducted, the first stage (i.e. the sludge produced in the stage one precipitation process and sometimes referred to as barium sulfate sludge) is recycled at a rate of about 60-250 times the amount of sludge actually produced in the first stage of the precipitation process. Generally, in one embodiment, it is anticipated that the recycle rate (pounds of recycled sludge/pounds of generate sludge) for the first stage precipitation process is in the range of about 100-150. The first sludge recycle rate can be varied and controlled. One of the underlying aims is to recycle enough of the first sludge (barium sulfate sludge) such that the NORM concentration in the second stage is at or below a threshold. The threshold is set such that the second stage sludge is not deemed a hazardous sludge. This aggressive recycling rate of the first sludge is often desirable because frac flowback is typically laden with anti-scalants, as well as chelating agents that tend to maintain dissolved solids, such as sulfate and barium in solution.

FIG. 1 shows a two-stage process for treating frac flowback. As noted in the drawings, the frac flowback contains barium, radium and other contaminants, such as hardness. Total radium (Ra 226 and Ra 228) concentrations in flowback vary considerably based on geography. In some cases, the total radium concentration will range from 3,000-5,000 pCi/L and in some cases can be as high as 9,000 pCi/L. Frac flowback is directed into one or two barite-radium reaction tanks. Each barite-radium reaction tank includes a downdraft mixer, such as the "TurboMixer®" that is marketed by Veolia Water Technologies, Inc. Recycled sludge and a sulfate source are added to the frac flowback in the first barite-radium reaction tank. Various sulfate sources can be used. In one embodiment, sodium sulfate is added. Sulfate is thoroughly mixed with the frac flowback in the two barite-radium reaction tanks. This results in the precipitation of barium sulfate. Barium sulfate, in turn, adsorbs radium and other NORM.

Frac flowback and precipitated barium sulfate and radium are directed into a downstream flocculation tank where a flocculant and, in some cases, a coagulant is added to the frac flowback. This results in the formation of floc that includes the precipitated barium sulfate and radium. From the flocculation tank, the frac flowback and floc are directed to a solids-liquid separator that separates the precipitants and suspended solids from the frac flowback. This yields a first effluent and a first sludge. As shown in the drawings, a portion of the first sludge is directed to a barite-radium sludge holding tank. From the barite-radium sludge holding tank, the first sludge is directed to a dewatering device, such as a filter press, which produces a dewatered first sludge that contains barium sulfate, radium and in some cases other NORM. The filter press also produces a filtrate that is directed to a barite-radium filtrate tank, as shown in the drawings.

Another portion of the first sludge is recycled to the initial barite-radium reaction tank where it is mixed with the incoming frac flowback and the sulfate that is being added to the frac flowback in the barite-radium reaction tank. Also, it is seen that the filtrate held in the barite-radium filtrate tank is recycled and joins the first sludge being recycled to the barite-radium reaction tank. The first sludge is recirculated from the solids-liquid separator to the initial barite-radium reaction tank where the first sludge is mixed with the frac flowback. By recycling the first sludge, this optimizes the reaction kinetics in the barite-radium reaction tanks. The amount of the first sludge recirculated is determined in part by the concentration of barium in the influent. At a minimum, five parts of barium sulfate (dry basis) should be recycled for every part of freshly precipitated barium sulfate produced (5:1 ratio). In some cases, it may be necessary to recycle up to a 20:1 ratio. This aggressive recycle rate is due to the presence of scale inhibitors and chelating compounds that are typically found in frac flowback.

Based on laboratory testing, the required barium sulfate sludge concentration in the initial barite-radium reaction tank is between 10 g/L-100 g/L. Under these conditions, a majority of the radium in the frac flowback will co-precipitate along with the barite solids. A portion of the strontium will also precipitate in the barite-radium reaction tanks as strontium sulfate. Also, it is expected that there will be precipitation of iron in the barite-radium reaction tanks and the precipitation is likely to be in the form of ferric hydroxide and this, it is hypothesized, enhances the removal of radium in the presence of barium sulfate particles via adsorption and sweep floc mechanisms. An oxidant, such as hydrogen peroxide, can be added to oxidize the iron from a ferrous state to the ferric state and a caustic can be added to achieve a pH at which the oxidation/precipitation of iron is optimal.

It should be noted that when the process depicted in the drawings is initially started, a seed crystal should be added to the system. A preferable seed is barium sulfate. However, freshly precipitated barium sulfate sludge or other seed crystals, such as calcium carbonate, may be added. The purpose of the seed crystals is to inhibit the precipitation of barium sulfate on the surfaces of the barite-radium reaction tanks, agitators, piping, etc. and to enhance precipitation kinetics. The seed is a one-time addition.

Once the process is operational, precipitated sludge which is recirculated back to the first barite-radium reaction tank acts as the seed for the precipitation of barium sulfate and radium sulfate. The recirculated first sludge also allows for the co-precipitation and adsorption of barium and radium. In testing, it was found that even without the addition of sulfate, when the feedwater is mixed with the recirculated barium sulfate sludge, this results in the precipitation of barium and radium from the feedwater. Without the recirculation of sludge, the barium in the feedwater is generally stable and will not precipitate to any significant extent.

There are a number of potential explanations for the above. Foremost, the feedwater from flowback sources contain scale inhibitors, as well as chelating agents. One method of overcoming the effect of these compounds is to expose them to massive amounts of barium sulfate sludge. The barium sulfate sludge overwhelms the ability of these compounds to keep metals, such as barium, strontium, radium, etc., in solution. Note that the surface of the recirculated sludge is "active" and allows for the co-precipitation and adsorption of freshly precipitated compounds. There are also other methods for inactivating scale inhibitors and chelating agents, such as adding oxidizing agents, ferric compounds or other destabilizing compounds.

The process of incorporating barium sulfate sludge recirculation with the precipitation of fresh barium sulfate solids reduces the sulfate dose required to precipitate the barium. In the '864 process discussed above, the reduction of barium to less than 10 mg/L resulted in residual sulfate concentrations of 369 mg/L. Using barium sulfate sludge recirculation provides an effective control of residual sulfates to less than 100 mg/L. Lower residual sulfate has a number of benefits:
  reduced sulfate consumption;
  reduced sludge generation (excess sulfates react with strontium, forming strontium sulfate and precipitating in the first stage adding to the sludge disposal cost);
  reduces or minimizes downstream scaling.

Finally, there is no need in the present process to measure the feed concentration of radium or other NORM. This is because the sludge recirculation step supplies more than a sufficient amount of barium with which the radium is co-precipitated and adsorbed onto the sludge. Given that the solubility product of radium sulfate (0.02 mg/L as $RaSO_4$) is 100 times lower than barium sulfate (2 mg/L as $BaSO_4$), a small amount of sulfate in the feed water will allow the radium to be removed with the barium as it is precipitated. Where there is significant radium and other NORM in the frac flowback the radium concentration in the first sludge, and particularly in the dewatered first sludge, may be relatively high. That is, the concentration of radium in the dewatered first sludge may exceed a threshold that functions as a demarcation between hazardous and non-hazardous waste. Threshold values can vary. In one application, the threshold is set at 25 pCi/wet g. In some applications, the dewatered first sludge will have a radium concentration that exceeds this threshold, and hence will be deemed a hazardous waste and require appropriate disposal. The process, however, is designed to minimize or reduce as much as practical the amount of dewatered first sludge. The strategy underlying this process is to remove all or substantially all the radium and other NORM from the frac flowback and contain it in a relatively small amount of sludge so as to reduce disposal cost.

Now turning to the second stage of the process, the first effluent produced by the solids-liquid separator is directed into one or more reactors for chemical softening. Note that the chemical softening reactors shown in the drawings include the draft tube mixer. To soften the first effluent, hydrated lime is added to the initial chemical softening tank and mixed with the first effluent. The purpose of the hydrated lime is to adjust the pH of the first effluent for the precipitation of magnesium and heavy metals present. The hydrated lime added to the first chemical softening tank increases the pH of the first effluent to approximately 10.5 to approximately 11.4. This causes the precipitation of magnesium hydroxide. Note that caustic soda could also be used to adjust the pH.

This is followed by a clarification process. As shown in FIG. 1, the first effluent after being subjected to chemical softening is directed to a ballasted flocculation settling process that effectively separates the first effluent into a second effluent and a second sludge. There are a number of options to settle solids in the chemical softening step. Due to the light and amorphous nature of magnesium hydroxide solids, it is preferable to employ a "ballast" to assist in settling the solids. Technologies, such as those disclosed in U.S. Pat. No. 6,919,031 (the '031 patent) and U.S. Pat. No. 9,169,144 (the '144 patent), can be incorporated. The disclosures of the '031 and '144 patents are expressly incorporated herein by reference. Examples of appropriate ballast include calcium carbonate and fine silica sand. A portion of the second sludge is recycled to the initial chemical softening reactor while another portion of the sludge is directed to a second sludge holding tank. From the second sludge holding tank, the second sludge is subjected to a dewatering process that produces dewatered second sludge. A filtrate produced in the dewatering process can be recycled and joined with the second sludge for recycle into the initial chemical softening reactor.

In this process, the second sludge, and particularly the dewatered second sludge, will have little, if any, radium and other NORM. As mentioned above, a threshold is selected that effectively separates hazardous and non-hazardous waste. The strategy underlying this process is that all, or substantially all, of the radium and NORM ends up in the first sludge and no, or relatively little, ends up in the second sludge. And that the radium and NORM concentration in the second sludge is at or below a selected threshold.

One of the challenges in removing radium from frac flowback is controlling the residual concentration of sulfate in the treated water. In designing and developing the processes described herein, it was found that by segregating the barium precipitation step from the chemical softening step, this enabled the sulfates in the treated water to be controlled to relatively low levels. This finding was unanticipated and surprising. The excess barium sulfate sludge recycle enables the precipitation of barium with relatively low sulfate addition, in some cases no sulfate addition was necessary. This, in turn, resulted in lower residual sulfate in the treated water. It is anticipated that, with aggressive barium sulfate sludge recycle in the first stage of the process, the residual sulfate concentration in the treated water can be maintained at less than 100 mg/L.

Figure 2:
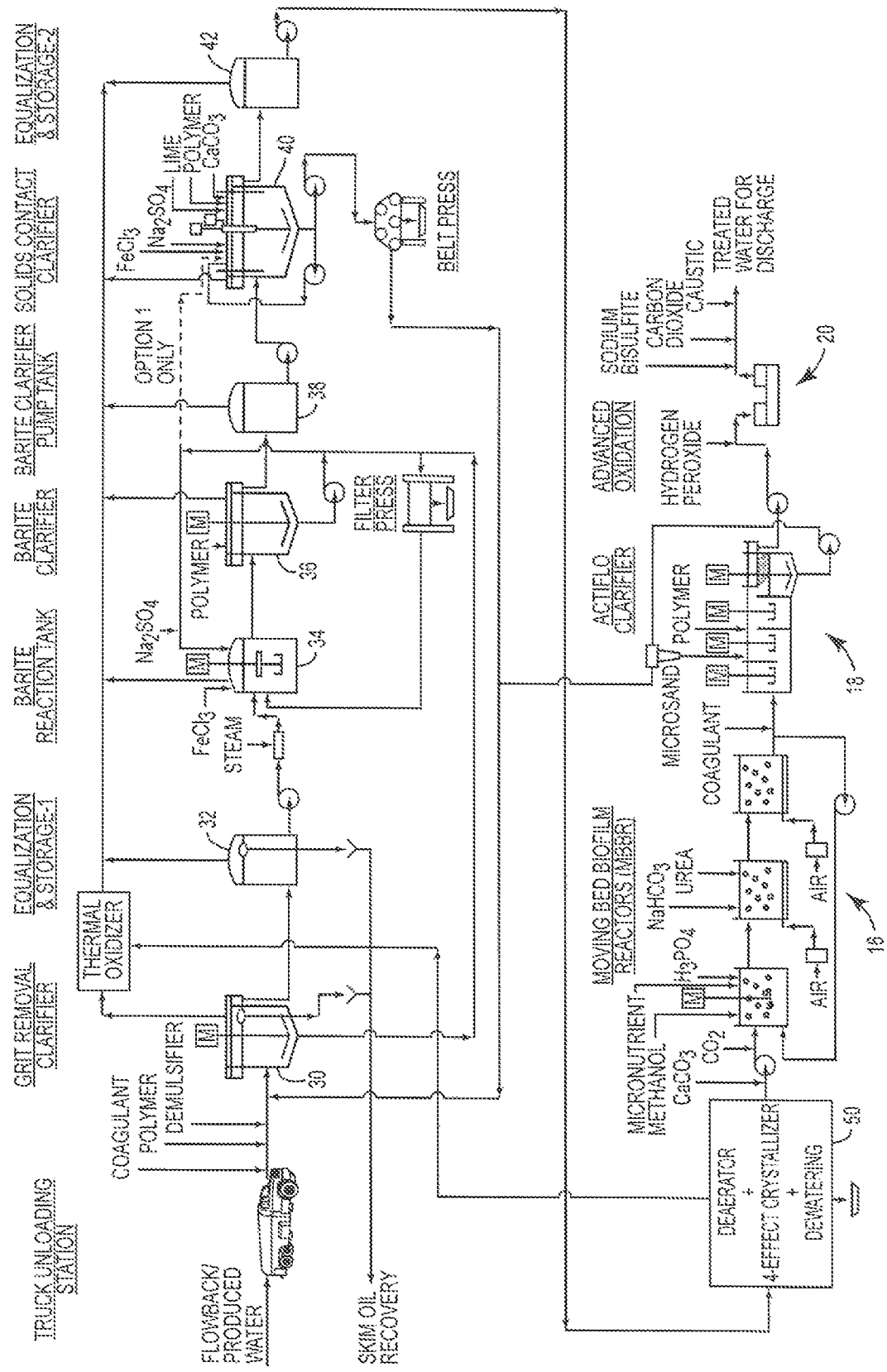
FIG. 2 is a schematic illustration showing an exemplary process for treating frac flowback wherein the process shown therein removes radium, other NORM, hardness, and other contaminants.

FIG. 1 illustrates an exemplary frac flowback process that is designed to remove radium, other NORM and hardness and to minimize the production of sludge that includes a radium concentration above a threshold value. FIG. 2 illustrates a more extensive frac flowback treatment process. However, the basic process shown in FIG. 1 and described above is incorporated into the FIG. 2 process.

With reference to FIG. 2, frac flowback is directed to a grit clarifier 30 for the removal of suspended solids and free oil. Prior to clarification, a coagulant and a flocculant can be mixed with the frac flowback. Further, an oxidant and a de-emulsifier can be mixed with the frac flowback via static mixers. A portion of the suspended solids in the frac flowback are settled in the grit clarifier 30. These settled suspended solids can be directed to a sludge holding tank and ultimately to a de-watering device such as a belt press, or the suspended solids can be sent directly to a de-watering device. Provided in the grit clarifier 30 is an oil skimmer. The oil skimmer skims oil from the surface of the frac flowback in the grit clarifier 30 and the skimmed oil is pumped to an oil collection tank.

Based on particle size distribution (PSD) results and subsequent Stokes' Law calculations, it is estimated that, in one example, an average of 30% (by mass) of the influent total suspended solids (TSS) will be settled and removed in the grit clarifier 30. These solids can be pumped to a sludge holding tank at an estimated concentration of 2.5 wt % where they can be combined with the sludge that is generated in the downstream selective ion removal process before being fed to the belt presses. The solids removed in the grit removal clarifier 30 accounts for about 4% of the total dry mass of solids that will need to be dewatered along with the selective ion removal solids in the belt filter presses. Water will overflow from the clarifier 30 into a small clarifier pump tank before being pumped to a larger equalization tank 32.

Clarified effluent from the grit clarifier 30 is pumped to the equalization tank 32. Equalization tank 32 also includes an oil skimmer that skims oil from the surface of the frac flowback and directs the skimmed oil to the oil collection tank.

Frac flowback is pumped from the equalization tank 32 to a barite-radium reaction tank 34 that includes an internal mixer. A coagulant ($FeCl_3$) and sodium sulfate, as well as recycled barite sulfate sludge, are mixed with the frac flowback in the barite-radium reaction tank 34. This facilitates the precipitation of barium sulfate (barite). In addition, a portion of the strontium in the frac flowback can also precipitate in the barium reaction tank 34 as strontium sulfate. As discussed above, since the frac flowback includes radium and NORM, there will be some precipitation of radium and other NORM in the barite-radium reaction tank. Barite-radium reaction tank 34, in a preferred embodiment, includes a draft tube mixer. Again, one of the purposes of the barite-radium reaction tank is to remove barium to a pre-treatment target (in one example) of less than 10 mg/L as a pre-treatment for the downstream crystallizer or crystallizers. As noted in the drawings, a coagulant, sodium sulfate and recycled barium sulfate sludge (the first sludge discussed above) are added to the barite-radium reaction tank 34 in order to facilitate the precipitation of barium sulfate. Radium in the frac flowback will precipitate along with the barium and strontium sulfate solids. The total suspended solids formed in this process can, in certain situations, be as much as 1500 mg/L. This depends, of course, on the average influent water quality conditions.

Frac flowback and the solids generated in the barite-radium reaction tank 34 are pumped to a barite clarifier 36. Both barite and strontium sulfate solids have relatively high specific gravities, 4.5 and 4.0 respectively, and therefore will settle rapidly. Solids precipitated in the barite-radium reaction tank 34 are allowed to settle in the barite clarifier 36. As noted above, a portion of the settled solids (barium sulfate sludge) will be recycled to the barite-radium reaction tank 34 to enhance the reaction growth kinetics of the barite crystals and the remaining solids will be purged and pumped to a barite sludge holding tank. Note that the sludge produced by the barite clarifier 36 is the first sludge discussed above with respect to FIG. 1. Also, it is this sludge that may have a radium concentration greater than the selected threshold, in which case this sludge could be deemed a hazardous waste. Effluent from the barite clarifier 34 will overflow by gravity to a barite clarifier pump tank 38 before being pumped downstream to a solids contact clarifier 40. It should be noted that in some cases the barite-radium reaction tank, barite clarifier and barite clarifier pump tank could be covered and gas-blanketed with all off-gases being routed to the thermal oxidizer.

The purpose of the solids contact clarifier 40 is to remove selected ions and more particularly to reduce the concentration of iron, magnesium, TSS and any remaining free oil in the frac flowback before the frac flowback reaches the crystallization system 14. In one embodiment, solids contact clarifier 40 provides coagulation, chemical precipitation, flocculation and clarification with sludge recirculation in a single vessel. Frac flowback is pumped from the barite clarifier pump tank 38 into the center well of the solids contact clarifier 40 where chemicals are added into a continuous mixed zone. A coagulant, such as ferric chloride, is added and mixed with the frac flowback. Hydrated lime can be added to provide hydroxide alkalinity to assist in the precipitation of magnesium as magnesium hydroxide. This increases the pH, in one embodiment, to approximately 10.8 in order to sufficiently reduce the magnesium concentration in the frac flowback. The solids contact clarifier 40 produces a sludge and this sludge constitutes the second sludge discussed with respect to FIG. 1. Because of the staged precipitation process, the system is designed such that this second sludge will have a radium concentration less than the selected threshold. This means that such sludge would not ordinarily be classified as a hazardous waste. Recycled sludge is added into the center well of the solids contact clarifier 40 to provide a seed crystal for the fresh precipitate. In this particular example, one may expect the TSS formed in the process to mainly consist of magnesium hydroxide with smaller amounts of calcium carbonate and ferric hydroxide precipitates, as well as small concentrations of oil that will adsorb onto the precipitated solids. A portion of the settled solids are recycled from the bottom of the solids contact clarifier 40 to the mixing zone therein to improve performance and to reduce chemical requirements. Excess solids are removed from the clarifier 40 and pumped to a sludge holding tank. Clarified effluent from the solids contact clarifier 40 will overflow into a clarifier effluent tank 42.

Sludge produced by the grit clarifier 30 and the solids contact clarifier 40 are pumped to a sludge holding tank. From the sludge holding tank, sludge is directed to a de-watering system. Filtrate produced by the de-watering system is recycled back to the grit clarifier 30. Concentrated de-watered cake produced by the de-watering system can be transported to a landfill for disposal.

From the clarifier effluent tank 42, the pre-treated frac flowback is directed to a section of the overall system where the frac flowback is de-aerated and subjected to thermal evaporation and crystallization. In FIG. 2, this is represented by block 50 which includes a de-aerator, crystallizer and a de-watering unit. In this regard, the frac flowback is first directed downwardly through the de-aerator. Steam is injected upwardly through the de-aerator and moves counter to the flow of the frac flowback. This removes air and other non-condensable gases from the frac flowback. Vapor is vented from the de-aerator and may include volatile compounds, such as ammonia, and volatile organics, such as benzene. Vapor vented from the de-aerator condenses and this is referred to as vent condensate.

After the frac flowback has been de-aerated, it is directed to the crystallization system which in the end produces a concentrate and steam that condenses to form a condensate. Various thermal evaporation/crystallization systems can be used to further purify the frac flowback resulting from pre-treatment. For example, a multi-effect forced circulation crystallizer can be employed. In one example, the crystallizer system is a thermal process that includes a steam driven four-effect crystallizer train that utilizes a low temperature process and a deep vacuum. This crystallization process combines a chilled water system and a conventional forced circulation crystallizer train to take advantage of the reduced solubility and boiling point rise of highly soluble salts, such as calcium chloride, at low temperature. Direct crystallization of calcium chloride and other highly soluble salts using this low temperature deep vacuum four-effect crystallization process may eliminate the need for full softening (which is an expensive pre-treatment) and can produce a crystalline solid or mixed salt that can be landfilled. In the end, the crystallization system 14 produces a condensate that is still frac flowback, albeit a highly treated form of frac flowback. Yet in many applications, the condensate from the crystallization system 14 and the vent condensate are sufficiently contaminated such that the condensates cannot be safely discharged. The contaminants that prevent safe discharge may vary from application to application. In one embodiment, the frac flowback may have a relatively high concentration of ammonia and benzene and the concentration of these two contaminants may still be present in the condensate to the extent that the frac flowback should be further treated.

To address the ammonia and benzene concentrations, the present process provides the optional biological treatment system 16 downstream of the crystallization system where the specific aim of the biological treatment system is to reduce the ammonia concentration, as well as reduce the benzene concentration in the influent to the biological treatment system. Carbon dioxide ($CO_2$) is injected into the influent to the biological treatment system 16 in order to adjust the pH down. In one embodiment, it is contemplated that the pH may be reduced to approximately 7.0 to approximately 8.0. Carbon dioxide will provide a portion of the alkalinity that may be required for the biological process. Various biological treatment systems can be utilized. One example is the MBBR discussed above and which provides both denitrification and nitrification, as well as partial benzene removal. The MBBR process is a fixed film biological process that does not require control sludge wasting or sludge recycling. As illustrated in FIG. 2, in this example the MBBR process includes three zones, a first denitrification zone operated under anoxic conditions and two downstream nitrification zones operated under oxic or aerobic conditions to nitrify the water passing through the zones. A portion of the effluent from the last nitrification zone is recycled to the denitrification zone. This MBBR nitrification/denitrification process, illustrated in FIG. 2, is effective to reduce the ammonia concentration and at the same time reduce the benzene concentration of the frac flowback.

Because the biological system 16 produces biomass, it follows that the effluent from the biological system includes suspended solids and, in many cases, the concentration of suspended solids exceeds applicable permit limits. To address this, the solids-liquid separation system 18 is placed downstream of the biological treatment system 16. Various solids-liquid separation systems can be employed. In the exemplary embodiment shown in FIG. 2, a ballasted flocculation system is employed. For example, an appropriate ballasted flocculation system is the "Actiflo" system marketed by Veolia Water Technologies, Inc. In any event, in a typical ballasted flocculation system, a coagulant, a polymer, and microsand are mixed with the water to be treated. With the aid of the coagulant and flocculant, the microsand forms ballasted floc that effectively removes suspended solids.

At this point in the process, the ammonia concentration has been reduced to acceptable permit limits. However, it is possible that, even after the biological treatment, the benzene concentration may still exceed applicable permit limits. To address this, the system and process shown in FIG. 2 provides the advanced oxidation system 20 discussed above. The advanced oxidation system is designed for benzene destruction. The advanced oxidation system employs an ultraviolet (UV) light reactor to emit high energy UV radiation into the frac flowback. Hydrogen peroxide is injected into the feed to the advanced oxidation system 20. Hydrogen peroxide reacts with UV light to create hydroxyl radicals which then react with benzene, oxidizing it to carbon dioxide and water. Sodium bisulfate can be injected into the treated effluent of the advanced oxidation system to quench any residual hydrogen peroxide. Carbon dioxide and a caustic can also be added for final pH adjustment if necessary.

This treatment process is an exemplary embodiment and is deemed to be capable of reducing the total ammonia concentration to less than 36 mg/L as N. With respect to benzene, it is hypothesized that the process will reduce benzene concentration to less than four parts per billion.

As noted above, the frac flowback may contain radium which is a naturally occurring radioactive material (NORM). One aspect of the technical problem addressed is that of finding a practical and efficient way of removing radium and NORM from the frac flowback. Frac flowback treatment processes can produce relatively large amounts of sludge. To address this technical problem, the processes described herein are designed to minimize the sludge produced by the various processes that contain radium and other NORM. In addressing this problem, the processes described herein strategically position and place the sludge producing processes such that sludge containing the radium and other NORM is minimized and segregated from other sludge produced in the process. In the case of the process depicted in FIG. 2, the radium and other NORM are removed in the barite-radium reaction tank 34 and the barite clarifier 36 upstream of where the hardness sludge is produced by the solids contact clarifier 40. Because the amount of sludge produced by the barite clarifier 36 is relatively small compared to the overall sludge produced by the process, the amount of sludge containing the radium and NORM is minimized.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of treating frac flowback containing barium, naturally occurring radioactive material (NORM) and hardness employing a dual stage precipitation process to reduce or minimize the production of sludge containing NORM, the method comprising:
   A. in a first stage precipitation process:
      i. mixing a sulfate source with the frac flowback in a barium sulfate-NORM reaction tank and precipitating barium sulfate and NORM;
      ii. after mixing the sulfate source with the frac flowback, subjecting the frac flowback to a solids-liquid separation process to produce a first effluent and a first sludge containing the barium sulfate and NORM;

B. in a second stage precipitation process:
   i. adding an alkaline reagent to the first effluent and increasing the pH of the first effluent;
   ii. chemically softening the first effluent by precipitating hardness;
   iii. after precipitating the hardness, subjecting the first effluent to a solids-liquid separation process and producing a second effluent and a second sludge containing the hardness;

C. recycling the first sludge containing the barium sulfate and NORM and mixing the first sludge with the frac flowback and the sulfate source; and D. recycling a sufficient amount of the first sludge to maintain the NORM concentration in the second sludge at or below a threshold level.

2. The method of claim 1 wherein the first stage precipitation process is carried in the absence of barium being added to the frac flowback.

3. The method of claim 1 wherein the first sludge is recycled at a rate (weight of sludge recycle/weight of sludge generated) of 100:1 or greater.

4. The method of claim 1 wherein recycling a sufficient amount of the first sludge includes recycling about 5 to 20 parts of barium sulfate (dry basis) to 1 part of precipitated barium sulfate.

5. The method of claim 1 wherein in the first stage precipitation process, the sulfate source is mixed with frac flowback in the barium sulfate-NORM reaction tank; and the method includes maintaining the concentration of the first sludge in the barium sulfate-NORM reaction tank between about 10 g/L and 100 g/L so as to precipitate a majority of the NORM in the first stage precipitation process.

6. The method of claim 1 including recycling an amount of the first sludge that yields a residual sulfate concentration of less than 100 mg/L.

7. The method of claim 1 including recycling a sufficient amount of the first sludge to maintain the concentration of NORM in the second sludge below a threshold limit of 25 pCi/wet g.

8. A method of treating frac flowback containing barium, strontium, hardness and naturally occurring radioactive material (NORM) and employing a dual stage precipitation process to reduce or minimize the production of sludge containing NORM, the method comprising:

A. in a first stage precipitation process:
   i. mixing a sulfate source with the frac flowback in a barium sulfate-NORM reaction tank and precipitating barium sulfate and NORM;
   ii. after mixing the sulfate source with the frac flowback, subjecting the frac flowback to a solids-liquid separation process to produce a first effluent and a first sludge containing the barium sulfate and NORM;

B. in a second stage precipitation process:
   i. adding an alkaline reagent to the first effluent in a reaction tank and increasing the pH of the first effluent;
   ii. chemically softening the first effluent by precipitating hardness;
   iii. after precipitating the hardness, subjecting the first effluent to a solids-liquid separation process and producing a second effluent and a second sludge containing the hardness;

C. recycling the first sludge containing the barium sulfate and NORM and mixing the first sludge with the frac flowback and the sulfate source;

D. recycling a sufficient amount of the first sludge to maintain the NORM concentration in the second sludge at or below a threshold level;

E. recycling the second sludge to the second stage reaction tank to assist in the chemical precipitation of hardness;

F. adding a "ballast" to the second stage precipitation process to assist in the settling of the solids; and G. adding soda ash (sodium carbonate) or other carbonate sources to the second stage precipitation process to assist in the precipitation of calcium carbonate and/or strontium carbonate.

* * * * *